(12) United States Patent
Alfonso

(10) Patent No.: US 9,451,257 B2
(45) Date of Patent: Sep. 20, 2016

(54) METHOD AND APPARATUS FOR IMAGE ENCODING AND/OR DECODING AND RELATED COMPUTER PROGRAM PRODUCTS

(71) Applicant: STMicroelectronics S.r.l., Agrate Brianza (IT)

(72) Inventor: Daniele Alfonso, Magenta (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 205 days.

(21) Appl. No.: 14/222,803

(22) Filed: Mar. 24, 2014

(65) Prior Publication Data

US 2014/0286584 A1 Sep. 25, 2014

(30) Foreign Application Priority Data

Mar. 22, 2013 (IT) ................ TO2013A0233

(51) Int. Cl.
| | |
|---|---|
| G06K 9/46 | (2006.01) |
| G06K 9/36 | (2006.01) |
| H04N 19/60 | (2014.01) |
| H04N 19/176 | (2014.01) |
| H04N 19/172 | (2014.01) |
| H04N 19/13 | (2014.01) |

(Continued)

(52) U.S. Cl.
CPC ........ *H04N 19/00775* (2013.01); *H04N 19/13* (2014.11); *H04N 19/132* (2014.11); *H04N 19/172* (2014.11); *H04N 19/174* (2014.11); *H04N 19/176* (2014.11); *H04N 19/18* (2014.11); *H04N 19/1883* (2014.11); *H04N 19/423* (2014.11); *H04N 19/44* (2014.11); *H04N 19/60* (2014.11); *H04N 19/63* (2014.11); *H04N 19/126* (2014.11)

(58) Field of Classification Search
None
See application file for complete search history.

(56) References Cited

U.S. PATENT DOCUMENTS

| | | |
|---|---|---|
| 5,838,597 A | 11/1998 | Pau et al. |
| 5,923,375 A | 7/1999 | Pau |

(Continued)

FOREIGN PATENT DOCUMENTS

EP 0858206 8/1998

OTHER PUBLICATIONS

Akbari, A.S.; Zadeh, P.B., "Compressive sampling and wavelet-based multi-view image compression scheme," in Electronics Letters, vol. 48, No. 22, pp. 1403-1404, Oct. 25, 2012.*

(Continued)

*Primary Examiner* — Andrae S Allison
(74) *Attorney, Agent, or Firm* — Seed IP Law Group PLLC

(57) ABSTRACT

An embodiment for encoding digital images includes: partitioning the images into image blocks, subjecting the image blocks to transform into the frequency domain, and, possibly after thresholding resulting in lossy encoding, subjecting the image blocks transformed into the frequency domain to variable length coding to produce compressed encoded image blocks. Transform into the frequency domain may be, e.g., via wavelet transform, such as Haar wavelet transform, and variable length coding may be via Exponential-Golomb codes. An embodiment may also be adapted for transferring picture data over a bus in a system such as, e.g., a System-on-Chip (SoC) by generating compressed encoded image blocks for transfer over the bus and decoding compressed encoded image blocks transferred over the bus.

21 Claims, 11 Drawing Sheets

(51) Int. Cl.
*H04N 19/63* (2014.01)
*H04N 19/132* (2014.01)
*H04N 19/18* (2014.01)
*H04N 19/174* (2014.01)
*H04N 19/44* (2014.01)
*H04N 19/169* (2014.01)
*H04N 19/423* (2014.01)
*H04N 19/126* (2014.01)

(56) References Cited

U.S. PATENT DOCUMENTS

| | | | |
|---|---|---|---|
| 5,986,711 A | 11/1999 | Pau | |
| 6,023,295 A | 2/2000 | Pau | |
| 6,934,420 B1 | 8/2005 | Hsu et al. | |
| 2006/0285756 A1 | 12/2006 | Sugita | |
| 2008/0285868 A1 | 11/2008 | Rai et al. | |
| 2010/0002946 A1* | 1/2010 | Dikbas | H04N 19/147 382/251 |
| 2011/0103489 A1* | 5/2011 | Takada | H04N 1/41 375/240.19 |
| 2011/0206289 A1* | 8/2011 | Dikbas | H04N 19/00484 382/238 |
| 2012/0013758 A1* | 1/2012 | Frederiksen | H04N 9/67 348/222.1 |
| 2013/0271566 A1* | 10/2013 | Chen | H04N 13/0048 348/43 |
| 2014/0169693 A1* | 6/2014 | Kuo | H04N 19/174 382/248 |

OTHER PUBLICATIONS

Search Report for Italian patent application No. TO20130233, Munich, Germany, Jan. 14, 2014, 2 pages.

Albanesi M G et al: "Image Compression by the Wavelet Decomposition", European Transactions on Telecommunications and Relatedtechnologies, AEI, Milano, Italy, vol. 3, No. 3, May 1, 1992, 10 pages.

Steven Pigeon, "Image Compression with Wavelets", Dr. Dobb's Journal, vol. 24, No. 8, Aug. 1, 1999, M&T Publishing, Redwood City, CA, USA, pp. 111-115.

A. Sheikh Akbari, and P. Bagheri Zadeh, "Compressive sampling and wavelet-based multi-view image compression scheme", Electronics Letters, IEEE, Oct. 25, 2012, Stevenage, Great Brittain, vol. 48 No. 22, 2 pages.

* cited by examiner

METHOD AND APPARATUS FOR IMAGE ENCODING AND/OR DECODING AND RELATED COMPUTER PROGRAM PRODUCTS

PRIORITY CLAIM

The instant application claims priority to Italian Patent Application No. TO2013A000233, filed 22 Mar. 2013, which application is incorporated herein by reference in its entirety.

TECHNICAL FIELD

The present disclosure relates to techniques of encoding and/or decoding digital image signals.

Various embodiments may apply to encoding and/or decoding still pictures involving e.g., image compression.

Various embodiments may be suitable for implementation in embedded systems, e.g., for reducing the bandwidth in transferring picture data between different devices, for instance within Systems-on-Chip (SoCs), and may be functional in reducing the associated memory footprint.

SUMMARY

Operation of modern multimedia systems, such as set-top boxes (STB) or mobile smartphones, involves extensive processing of multimedia data for a variety of applications such as, e.g., movie watching, photo browsing, displaying user interfaces and so on. All these tasks may result in a large extent of bandwidth being devoted to transferring multimedia information within a device. This may result in notable power consumption, which may become a burden, e.g., in battery-powered mobile devices and may also affect operation of, e.g., STB's in terms of power efficiency.

Motion-compensated temporal prediction in video decoding may be exemplary of such processing. For instance, one may consider the case of a decoder decoding an MPEG-encoded bitstream containing an HDTV video with spatial resolution of 1920×1080 pixels at 24 frames per second (i.e., the current Blu-Ray Disc format). Assuming that an average 90% of the 16×16 macroblocks of the video may be encoded in Inter mode (i.e., using temporal prediction from a previous picture), every second the decoder may have to fetch from the reference frame buffer memory a total of 1920× 1080×24×0.9×1.5≈67 MByte/s of data bandwidth (the 1.5 factor accounts for chrominance components in the YUV 4:2:0 color space). This value may increase to twice as much if bi-directional motion-compensation is used (as in fact may be the case), which implies fetching from memory twice the amount of data for each macroblock.

The bandwidth requirements may notionally be reduced with an improved data organization in the main memory and by adopting memory hierarchies with caches.

In that respect, the following may be taken into account.

Modern multimedia systems may include multiple processing stages, video compression being performed in just one of these stages. Pictures may be transferred several times from one processing stage to another; this may imply a total memory bandwidth multiplied by the number of processing stages involved in the processing pipeline.

Requirements and specifications may quickly become more and more taxing in terms of both spatial and temporal resolution. In a time perspective, current processing of HDTV video represents a minimum level, with a trend towards Ultra-HDTV resolution, involving pictures as large as 4k by 2k pixels (4 times HDTV) and a frequency of up to 60 or even 120 pictures per second.

Picture data may not be used exclusively for video, but also for textures in graphic applications, that is, with graphic objects composed by a mesh of connected polygons with a texture mapped on them for giving the object a realistic appearance. Applications like videogames impose very high requirements due to the need of transferring extensive amounts of such texture data.

Bandwidth dedicated to transferring multimedia data (and the related power consumption) may thus be a source of increased concern.

Data compression before the data may be transferred followed by decompression after transfer may represent a solution to reduce such a bandwidth. Characteristics adapted to render a compression system suitable for use in, e.g., embedded hardware implementations may include the following:

quality: in order to be processed by different stages in a multimedia pipeline, a picture may be compressed and decompressed several times, and quality degradation may become more evident each time the picture may be compressed. Visible artifacts should be avoided in case of lossy compression. For certain applications, the capability of working in lossless mode, so that compression does not generate any loss of information, may be an asset;

delay: speed of computation and data transfer may represent critical aspects in a modern multimedia system. If included in a processing pipeline, an image codec (i.e., encoder-decoder) should not introduce significant delays as this might affect performance of the whole system;

complexity: while achieving significant bandwidth and power reduction, an image codec should not increase significantly the silicon area of, e.g., the whole SoC. Low computational requirements combined with the capability of pipelining and parallel processing may represent important characteristics for limiting both delay and complexity.

Image compression is still a largely active research field, and the scientific community shows continuing interest for new image-compression methods for a variety of different applications.

For instance, documents such as U.S. Pat. No. 6,023,295 B1, U.S. Pat. No. 5,838,597 B1, U.S. Pat. No. 5,923,375 B1, and U.S. Pat. No. 5,986,711 B1, and EP-A-0 858 206, which are incorporated by reference, disclose procedures for image compression, which procedures may be incorporated as ST® REMPEG in various ST® products.

The JPEG standards committee has developed over the years a number of international standards for image compression, including, e.g., JPEG-XR, a still-image compression standard and file format for continuous-tone photographic images, which supports both lossy and lossless compression.

During 2012, the Khronos Group announced the release of a royalty-free, Adaptive Scalable Texture Compression (ASTC™) specification, defining a new, highly flexible texture compression scheme for developers using OpenGL® ES and OpenGL® 3D graphics APIs. ASTC™ is a compression technology which may be used for encoding a wide variety of texture formats at bit-rates of 8 bits per pixel to below 1 bit per pixel, and was developed with the aim of allowing significant reductions in GPU memory bandwidth and application memory footprint, while preserving image quality.

During the standardization of HEVC (High Efficiency Video Coding), which is the successor of the H.264/AVC video coding standard, the MPEG/ITU-T standards committee considered the inclusion in the HEVC standard of a method for compressing the reference frame buffer in order to reduce memory bandwidth and footprint, and different methods were considered for the purpose, both lossy and lossless. Also, the Wireless Gigabit Alliance considered the inclusion of ad-hoc image-compression methods for wireless transmission of HD images among different devices.

Various embodiments provide improvements in the area of image-data compression, for possible use, e.g., in embedded image-compression technology for compression in SoCs and/or in compliance with various international standards.

Various embodiments may concern a corresponding decoding method, corresponding encoding and/or decoding apparatus, as well as computer program products loadable into the memory of at least one computer and including software code portions that are able to execute the steps of the encoding and/or decoding methods when the product is run on at least one computer.

As used herein, reference to such computer program products is understood as being equivalent to reference to computer-readable means containing instructions for controlling the processing system in order to co-ordinate implementation of the method(s) according to embodiments. Reference to "at least one computer" is intended to highlight the possibility for an embodiment to be implemented in modular and/or distributed form.

Various embodiments may provide a method of low complexity for encoding and/or decoding, e.g., still pictures, suitable for low-delay and low-complexity hardware implementations in embedded systems, particularly for the purpose of reducing the bandwidth involved in transferring picture data between different devices or within SoCs, while also reducing the memory footprint.

Various embodiments may provide a method for image compression having characteristics of low delay, low complexity, and high quality, and which may support both lossy and lossless compression modes.

BRIEF DESCRIPTION OF THE DRAWINGS

Various embodiments will now be described, purely by way of non-limiting example, with reference to the annexed figures.

DETAILED DESCRIPTION

Figure 1:
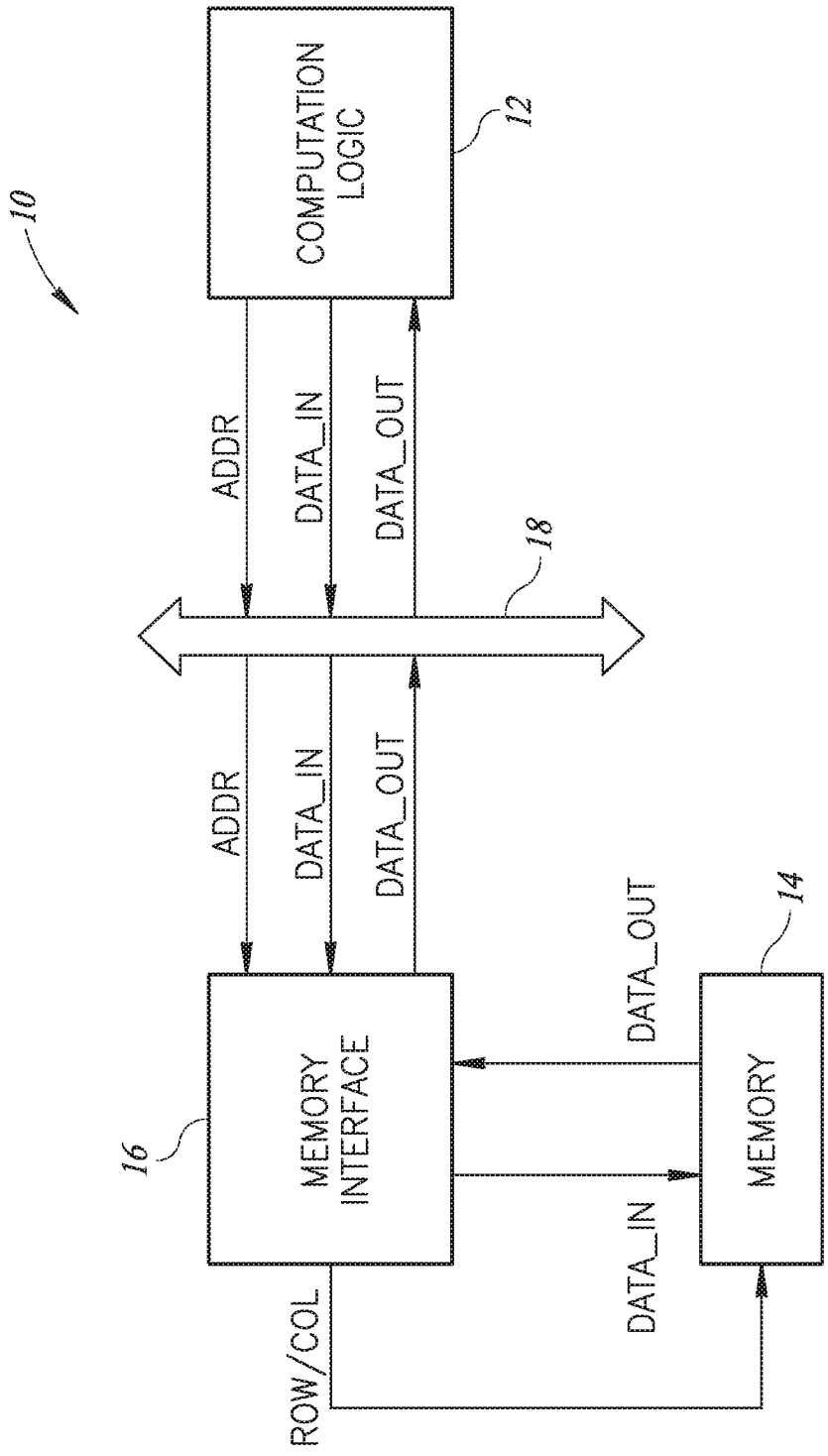
FIG. 1 is a schematic representation of a processing system for processing, e.g., digital image signals, according to embodiments.

In the ensuing description, various specific details are illustrated, aimed at providing an in-depth understanding of various exemplary embodiments. The embodiments may be obtained without one or more of the specific details, or with other methods, components, materials, etc. In other cases, known structures, materials, or operations are not illustrated or described in detail so that the various aspects of the embodiments will not be obscured. Reference to "an embodiment" or "one embodiment" within the framework of the present description is intended to indicate that a particular configuration, structure, or characteristic described in relation to the embodiment may be comprised in at least one embodiment. Hence, phrases such as "in an embodiment" or "in one embodiment" that may be present in various points of the present description do not necessarily refer to one and the same embodiment. Also, details disclosed herein in connection with a function of a particular exemplary embodiment will be understood to be applicable to perform the same function also in the other exemplary embodiments disclosed. Moreover, particular conformations, structures, or characteristics may be combined in any adequate way in one or more embodiments.

The references used herein are provided merely for the convenience of the reader and hence do not define the extent of protection or the scope of the embodiments.

A number of basic concepts will now be briefly recalled by way of introduction to a detailed description of embodiments.

Wavelets

Wavelet analysis may be based on the representation of a signal through an oscillating waveform, which may be scaled and translated to build a set of base functions. The signal may be then represented as a combination of those base functions. Wavelet analysis may be conceptually similar to Fourier analysis, where a signal may be represented as a combination of sinusoids.

Various different base functions can be used for wavelet analysis, some of them being particularly adapted for image compression. A simple type of wavelet may be the Haar wavelet, proposed in 1909 by Alfréd Haar; this can be implemented in practice by simple additions (sums) and subtractions, without complex operations, and may be suitable for highly-parallelized hardware implementations.

The uni-dimensional Wavelet transform of a discrete signal a can be written as b=W*a where W is the wavelet transformation matrix and b is the transformed signal. In the case of vectors with 2 elements, the corresponding 2×2 Haar transformation matrix may be given by $$W = H_2 = \begin{bmatrix} 1 & 1 \\ 1 & -1 \end{bmatrix}$$

Exponential-Golomb Codes

Exponential-Golomb codes are Variable Length Codes (VLC) that may be used to map source symbols to codes with a variable number of bits depending on the symbol probability, e.g., in order to obtain a compression of a data stream.

For a positive integer I, a k-th order Exponential-Golomb code generates a binary codeword in the following form:

$$EG_k(I) = [(L'-1)\text{zeros}][\text{most significant}(L-k)\text{bits of } \beta(I)+1][\text{last } k \text{ bits of } \beta(I)]$$

where $\beta(I)$ is the natural binary representation of I, L is the bit length of $\beta(I)$ and L' is the length of $\beta(1+I/2^k)$.

A simple form of an Exp-Golomb code may be the code of order k=0, for which $EG_0(0)=1$, $EG_0(1)=010$, $EG_0(2)=011$, $EG_0(3)=00100$, $EG_0(4)=00101$, etc.

The block diagram of FIG. 1 represents an exemplary system 10 including:
- a computation logic block 12, to elaborate, e.g., picture data;
- a memory logic 14, to store, e.g., picture data;
- a memory interface 16 responsible for reading and writing data in the memory 14 at a given address, by driving the row/columns in the array of memory cells; and
- a system bus 18 (i.e., a "channel") for data transfer.

In various embodiments, such a system 10 may include a number of communication links between blocks, e.g.:
- DATA_IN is the data being written in the memory 14;
- DATA_OUT is the data being read from memory 14;
- ADDR designates the memory address where to read or write data;
- ROW/COL is exemplary of row (i.e., line)/column management of the memory 14 by the interface 16.

Figure 2:
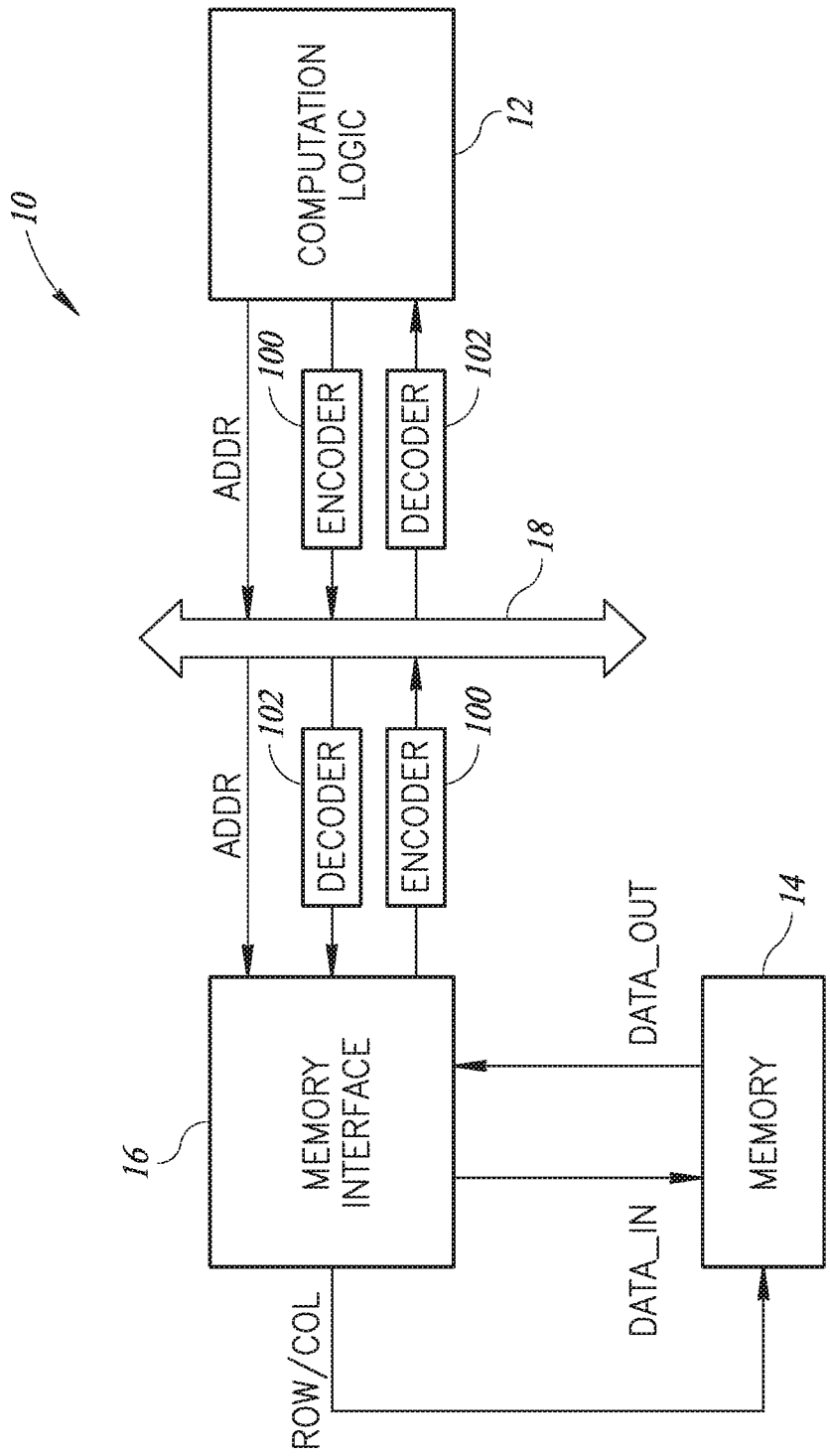
FIGS. 2 and 3 are schematic diagrams of embodiments.
Figure 3:
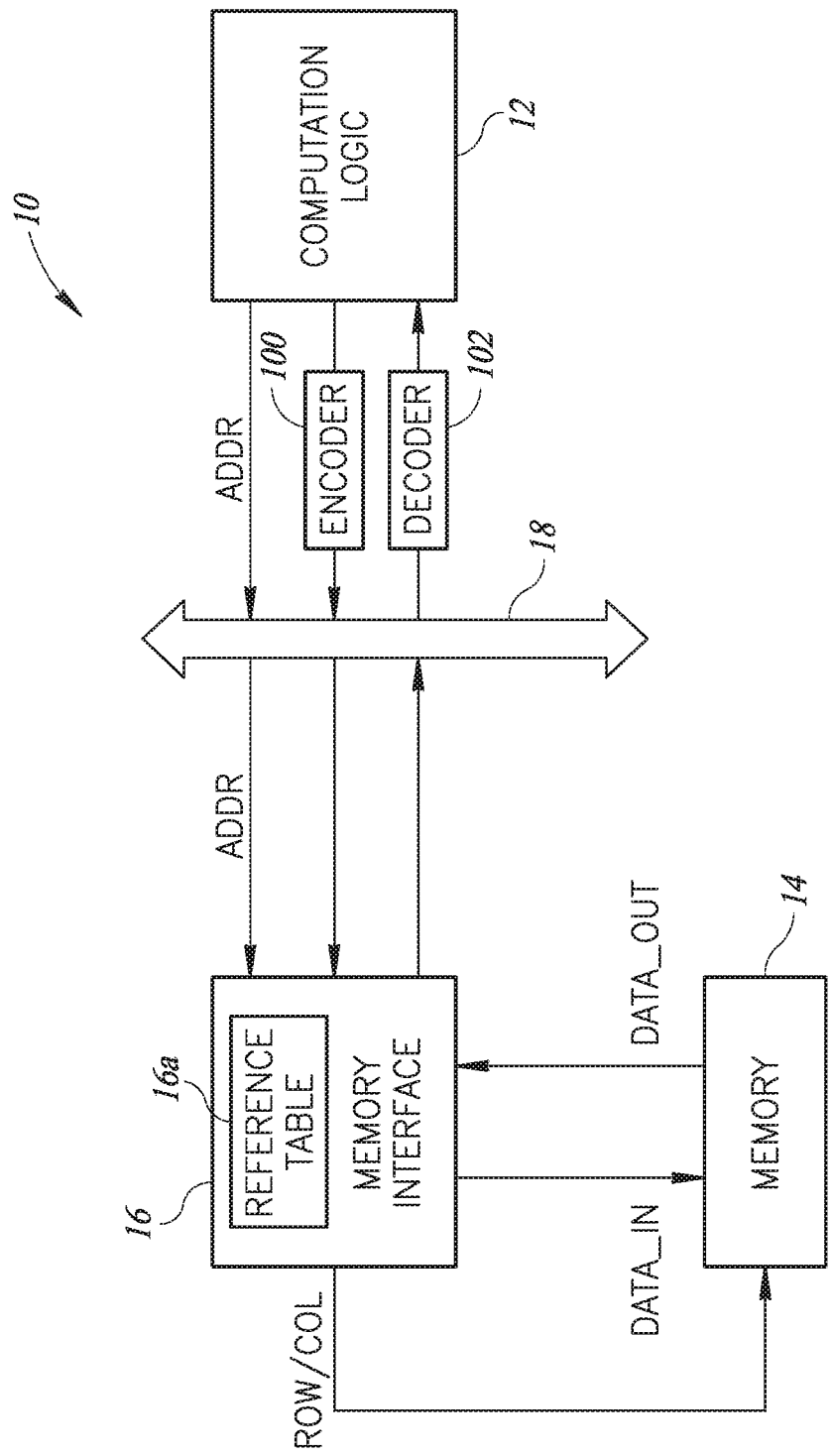

Various embodiments may aim at reducing the bandwidth of data transferred on the system bus 18. As schematically represented in FIGS. 2 and 3, this may involve the presence of encoders to compress the data and decoders to decompress the data. Parts and elements identical or equivalent to those already described in connection with FIG. 1 may be indicated with the same reference numerals in FIGS. 2 and 3, thus making it unnecessary to repeat the relative description thereof.

In various embodiments, encoders and decoders may be arranged as shown in FIG. 2, that is with a first pair of an encoder 100 and a decoder 102 between the memory interface 16 and the bus 18, and a second pair of an encoder 100 and a decoder 102 between the bus 18 and the computation block 12.

It will otherwise be appreciated that, while the same reference numerals may be used for ease of presentation, the encoders and, respectively, decoders shown in the various figures may not necessarily be identical.

In the exemplary embodiment considered, the data to be written in the memory 14 and to be read from the memory 14 may be compressed before being transferred on the system bus 18 and decompressed after the transfer on the system bus 18. In that way, bandwidth reduction may be achieved on the system bus without affecting the memory footprint.

The block diagram of FIG. 3 is exemplary of embodiments where only one encoder/decoder pair may be present, e.g., with an encoder 100 and a decoder 102 arranged between the bus 18 and the computation block 12.

In the exemplary case of FIG. 3, the data to be written in the memory 14 may be compressed (at 100) before being transferred on the system bus 18, but is not decompressed after that, and may be stored in the memory 14 in compressed form. Similarly, the data extracted from the memory 14 may be already compressed, so it may be sent through the bus 18 in compressed form and then decompressed (at 102) only after transfer over the system bus 18. In various embodiments, the exemplary case of FIG. 3 may achieve a two-fold advantage: reduction of the bandwidth on the bus and reduction of the memory footprint.

Various embodiments may take into account that, if the data is compressed by a factor which may be variable and in general not known a priori, random access to data in the memory 14 may be affected, since the location where each pixel of original data can be found in the memory may not be known a priori.

In various contingencies, this may not be a problem because the picture data may be accessed sequentially, so that the first (i.e., starting) memory location of the next block of data to be transferred may be related (e.g., simply identical) to the last (e.g., ending) memory location of the last block of data transferred plus one.

Also, in certain applications, random access may occur with a certain degree of granularity. In various embodiments, this may be dealt with by modifying the memory interface 16 to include a table 16a (for instance a LUT block) and by partitioning the pictures which are processed, e.g., in "stripes".

Various embodiments may thus involve a block-based hybrid coding method that compresses data by working on blocks of, e.g., N×N pixels.

In various embodiments, a "stripe" may be defined as a set of BLC consecutive blocks in raster scan order within the picture, where BLC is an integer number so that $1 \leq BLC \leq TB$, where TB is the total number of (e.g., N×N) blocks in the picture.

Figure 4:
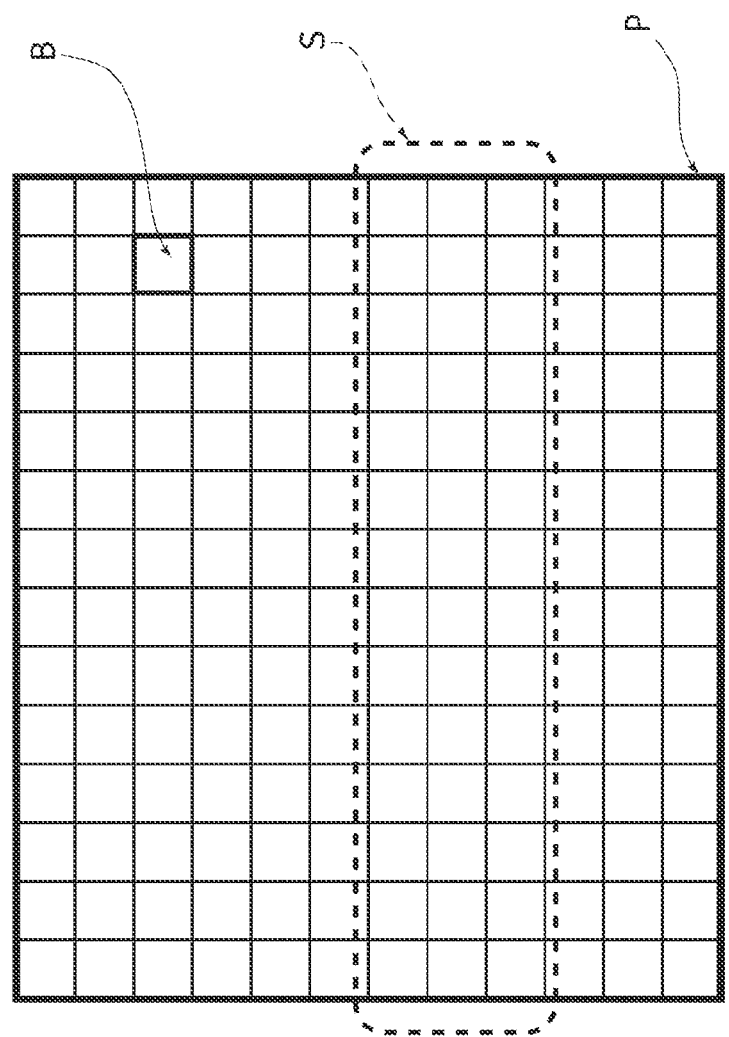
FIGS. 4 and 5 are exemplary of data handling in embodiments.

FIG. 4 is exemplary of a picture P being divided in blocks B arranged in stripes S, with each stripe S including, e.g., 3 rows of blocks. It will be appreciated that such a partitioning is purely exemplary: for instance, in various embodiments, the stripes S may not necessarily contain an integer number of block rows and/or may not be all identical in size as shown by way of example in FIG. 4.

In various embodiments, the stripes S may be conceived in such a way as to allow random access to the picture data, that is, by allowing the system to access each stripe randomly. In order to do that, in various embodiments, the starting memory location where each stripe may be allocated may be stored, e.g., by building a look-up table (LUT) such as, e.g., 16a in FIG. 3, that converts the "hypothetic" memory address of the stripe (i.e., the memory address at which the stripe would start if stored in uncompressed format) in the "true" memory address of the stripe (i.e., the memory address at which the stripe actually starts, in compressed format). The degree of granularity of random access to the picture data in the memory may be determined by the size of the stripe, which may be given by the parameter B. With this approach, the computation block 12 may randomly access the data in the memory on a stripe-by-stripe basis by specifying the starting address of each stripe S without having to be aware that data may be stored in the memory in compressed form.

In various embodiments, the memory interface 16 may be able to convert the input memory address into a true memory address by means of the LUT 16a, with the data fetched from the correct memory address in compressed form, transmitted on the bus 18 still in compressed form, and finally decompressed before being used.

Table I hereinbelow is exemplary of possible embodiments of such a LUT, where:
- column 1 shows the stripe number (which may be omitted in a practical implementation);
- column 2 shows the size of each stripe in uncompressed form, e.g., in block units or in bytes (again, this column may be omitted in practical implementations and is shown only to facilitate understanding of the example); and
- column 3 shows the starting memory address of each stripe in the memory 14.

TABLE I

| Stripe Number | Stripe Size | Stripe Address |
| --- | --- | --- |
| 0 | 12,000 | 0x000A12 |
| 1 | 12,000 | 0x000F00 |
| 2 | 8,000 | 0x00A230 |
| 3 | 16,000 | 0x00B165 |
| 4 | 12,000 | 0x00D23E |
| 5 | 12,000 | 0x000E10A |
| 6 | 12,000 | 0x000AF01B |
| ... | ... | ... |

Figure 5:
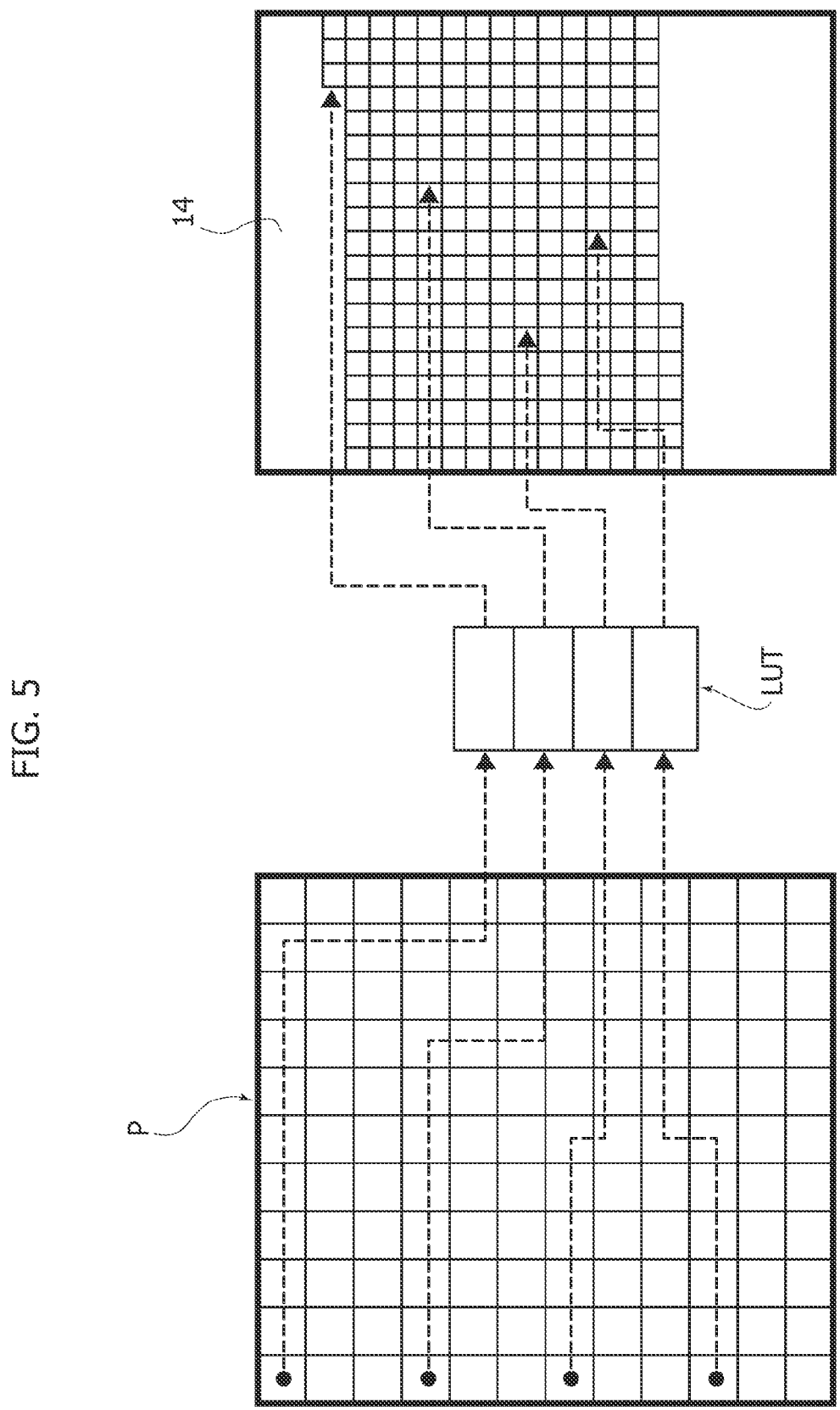

FIG. 5 is exemplary of how, in various embodiments, a LUT may be used to map stripes of a picture P (shown on the left) to actual memory cells in, e.g., the memory 14 (shown on the right) where the data may be stored in compressed form with a variable length.

Encoder

Figure 6:
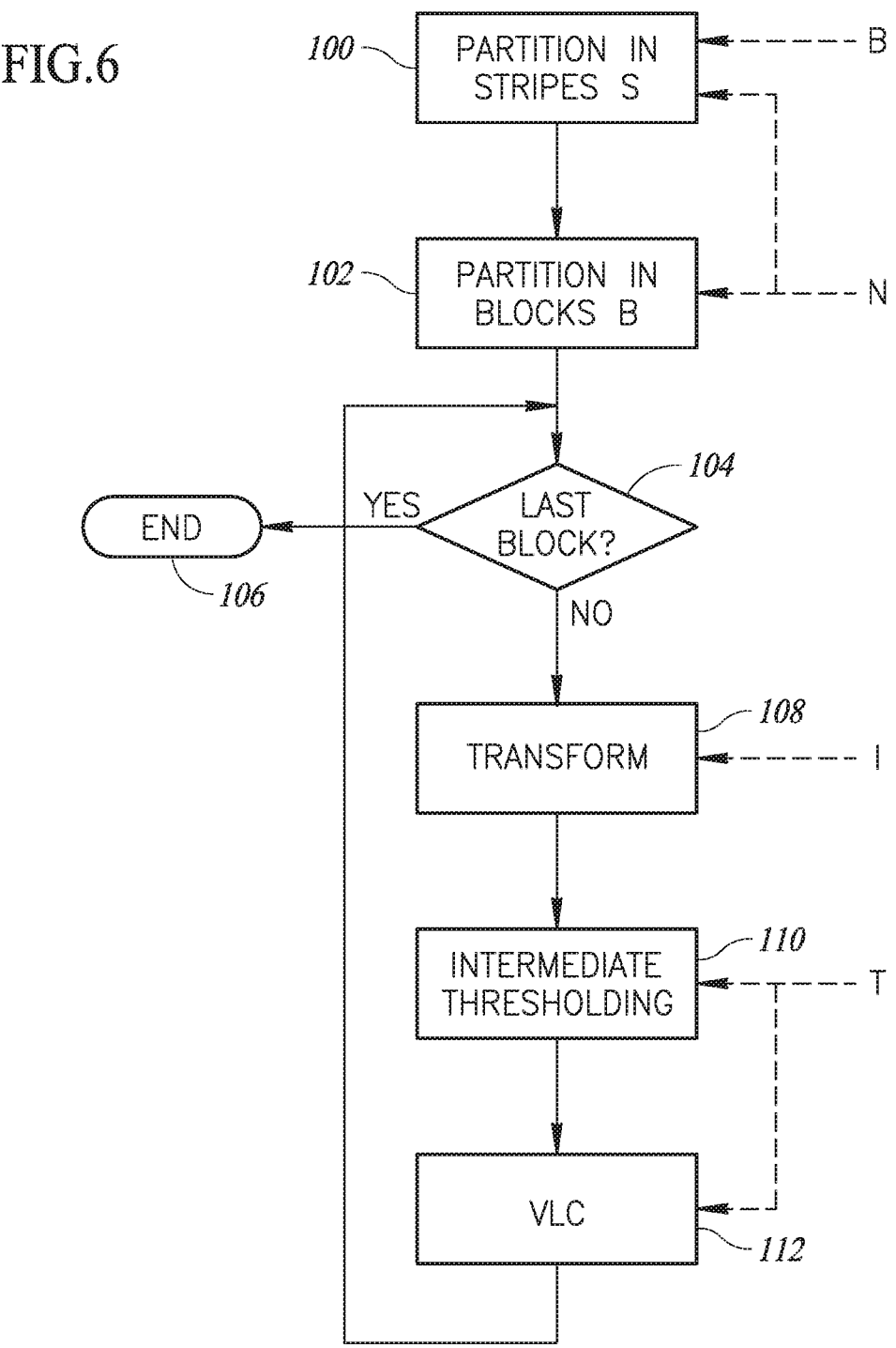
FIG. 6 is an exemplary flow chart of data processing in embodiments.

FIG. 6 is an exemplary flowchart of an encoding process according to embodiments.

In a step 100, the picture or each component of the picture P (which may be, e.g., in YUV, RGB, or other formats) may be partitioned in stripes S; then in a step 102, each stripe S may be partitioned in blocks B thus permitting an encoding process to be applied to each block B separately.

In various embodiments, BLC may indicate the number of blocks contained in each stripe, whereas N expresses the size of each block in pixels. In various embodiments, each block may be a square array of N×N pixels.

In various embodiments, the encoding process may receive pixels as input data and output a compressed binary stream.

In various embodiments, as exemplified in FIG. 6, the encoding process on a block-by-block basis may include a sequence of steps performed iteratively.

For instance, in a possible embodiment, the iterative sequence may be made conditional to the negative outcome (e.g., Last block? NO) of a check 104 as to whether the input block may be the last one. If the check at 104 yields a positive outcome (i.e., Last block? YES) indicative that the last block has been processed, then the process comes to an end at 106.

In various embodiments, as exemplified in FIG. 6, the encoding process may include two main steps, namely transform 108 and Variable Length Coding—VLC 112, with the possible provision (in the case of "lossy" embodiments) of an intermediate thresholding step 110.

Transform

In various embodiments, each block may be transformed in the frequency domain as indicated in 108 by using a transform into the frequency domain. Exemplary of such a transform is, e.g., the Haar Wavelet.

To that effect, in various embodiments, a bi-dimensional (2D) Haar transform including a number I of iterations may be applied to the block being transformed.

In various embodiments, a number I of iterations may be applied to the block being transformed, where each iteration includes two (sub)steps.

In the first step, uni-dimensional Haar transform may be applied line-by-line (resp. column-by-column); in the second step a uni-dimensional Haar transform may be applied column by column (resp. line-by-line).

In various embodiments, a uni-dimensional Haar wavelet may be implemented as follows.

Given a vector a[ ] of N elements, the Haar wavelet generates a vector t[ ]=[l[ ], h[ ]] composed by two sub-vectors of N/2 elements, where each element may be calculated as follows $$l[i]=(a[2*i]+a[2*i+1])\!>\!>\!1$$

$$h[i]=(a[2*i]-a[2*i+1])$$

Those formulas guarantee that the transform can be exactly inverted without losses.

The notation ">>1" may be used to indicate a division by two implemented by a logical right shift of 1 bit.

The sub-vector l[ ] In contains the low-frequency components of the input signal and sub-vector h[ ] contains the high-frequency components. At each iteration after the first one, the transform into the frequency domain (e.g., Haar wavelet) may be applied only to the low-frequency components resulting from the previous iteration, and the high frequency components may be left unaltered and simply copied from one iteration to another, which means that the size of the processed data may be halved at each iteration.

In two dimensions, a signal matrix A may be decomposed in four sub-matrixes LL, LH, HL and HH, where;

LL contains the low-frequency components in both the horizontal and the vertical directions;

HL contains the high-frequency components in the horizontal direction and the low-frequency components in vertical directions, the opposite applying to LH;

HH contains the final high-frequency components in both the vertical and the horizontal directions.

Figure 7:
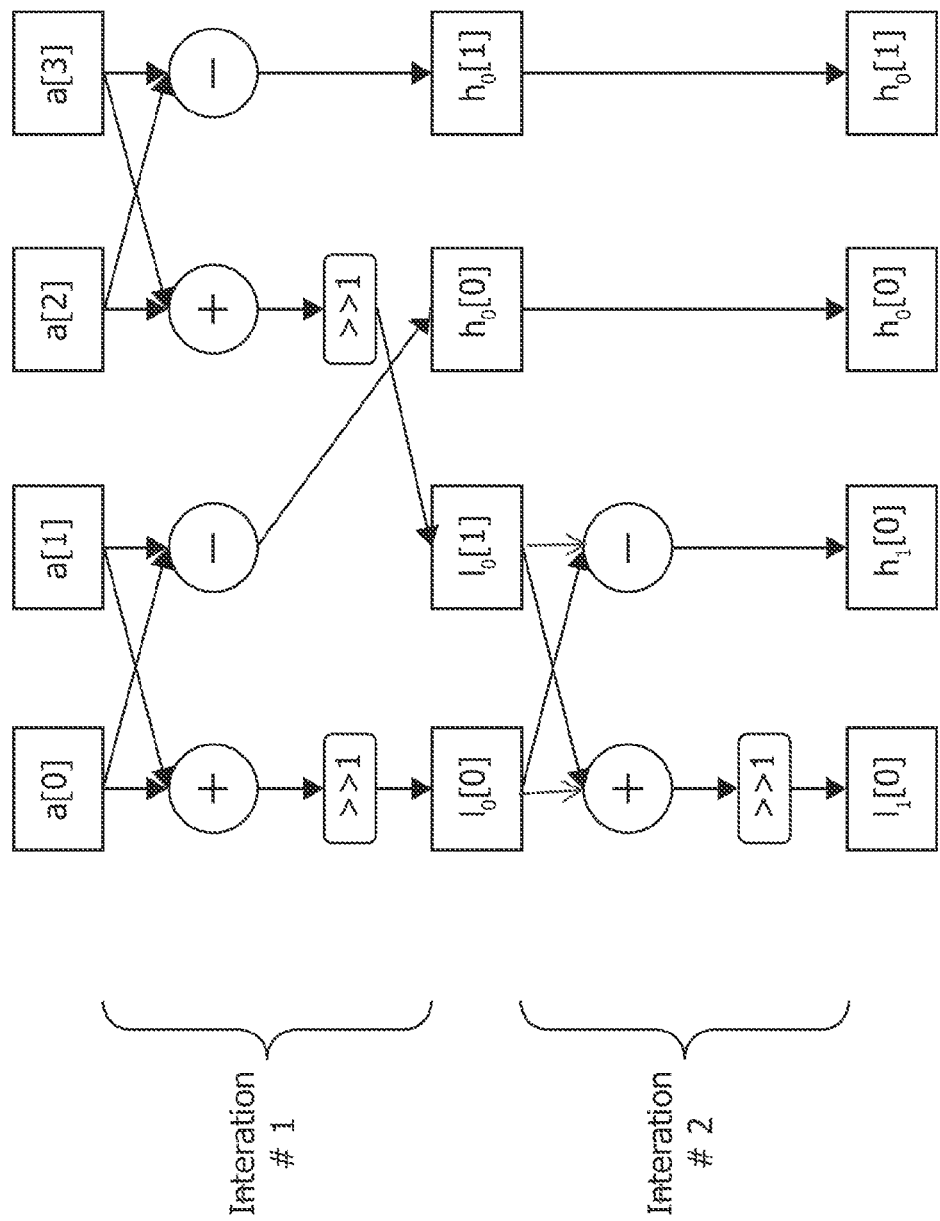
FIG. 7 is exemplary of organization of iterations in embodiments.

FIG. 7 may be exemplary of a possible dataflow of two iterations of the uni-dimensional transform (e.g., Haar wavelet) applied on a vector of four elements, as adapted to be implemented in various embodiments.

Figure 8:
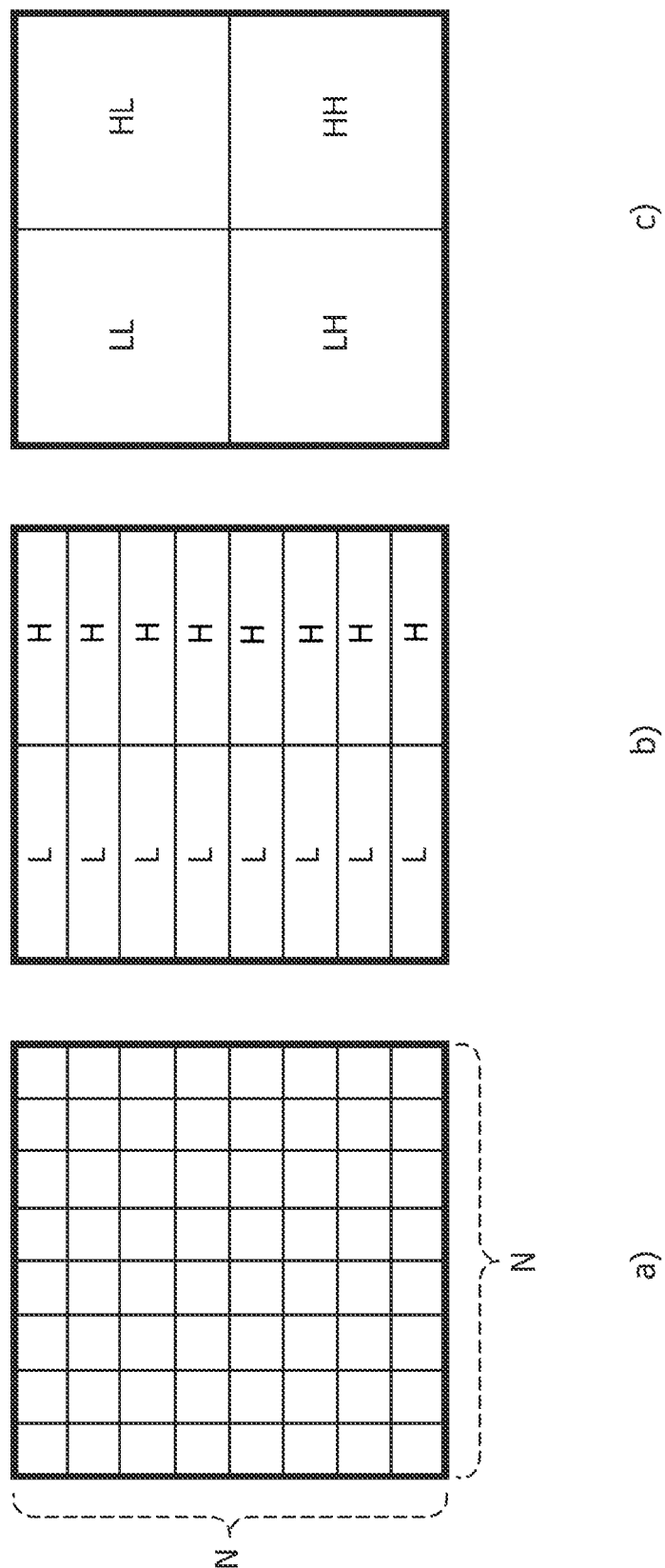
FIG. 8, which includes three portions indicated a), b) and c), respectively.

FIG. 8 shows how one iteration of such a transform may be applied to a matrix of N×N elements—the left-hand portion of FIG. 8, labeled a).

In the first step each row may be divided in two sub-vectors L=l[ ] and H=h[ ]—the center portion of FIG. 8, labeled b).

In the second step the four sub-matrixes LL, LH, HL and HH may be generated by applying the uni-dimensional transform on the columns—right hand portion of FIG. 8, labeled c).

Figure 9:
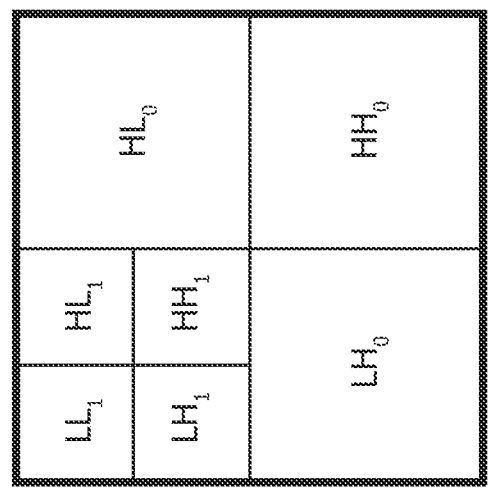
FIG. 9, illustrate various exemplary arrangements of data in embodiments.

FIG. 9 shows how a second iteration of the transform (e.g., wavelet) may be applied only to the LL sub-matrix, to derive therefrom a new set of sub-matrices including a new LL sub-matrix as well new LH, HL and HH sub-matrices that have been labeled with subscript 1, to distinguish them from the sub-matrices marked with subscript 0, which correspond to the first iteration previously applied.

In various embodiments, if the original data (i.e., the input pixel components) have a dynamic range of R bits, the LL components may have the same dynamic range of R bits, the LH and HL components may have a dynamic range of R+1 bits, and the HH component may have a dynamic range of R+2 bits.

In various embodiments, the dynamic range of input data may be R=8 bits (0 . . . 255). Then the LH and HL components may be expressed as 9 bits (−255 . . . +255) and the HH components may be as 10 bits, but can be safely expressed as 9 bits without losses, since the HH coefficients may have low values in practice.

Thresholding

Various embodiments may adopt thresholding as schematically indicated at 110 in FIG. 6, resulting in a lossy compression step which changes the transformed coefficients (i.e., the results of the transform at 108) without appreciable impact on the quality of the reconstruction at the decoder side.

In various embodiments, such thresholding may have a purpose similar to the quantization step used in more complex compression systems, while being computationally much simpler than quantization, in that thresholding may be implemented with a simple comparison operation.

For instance, given an input value x and a threshold T>0, the output value y may be zero if the absolute value of x is less than or equal to T, otherwise y may be equal to x.

In various embodiments, thresholding may be applied only to higher-frequency transformed coefficients, i.e., those coefficients belonging to the HL, LH or HH sub-matrixes, whereas low-frequency components LL may be left unaltered.

In various embodiments, such encoding step may aim at increasing the number of transformed coefficients which may be equal to zero, so that in the subsequent VLC coding stage indicated at 112, those coefficients may be coded with a minimum number of bits equal to one.

In various embodiments, eliminating small coefficients below a certain threshold by setting them to zero may have a positive effect on the compression factor, without appreciably affecting the quality of reconstruction, if the threshold may be kept reasonably low.

In various embodiments, the threshold may be fixed and pre-determined.

In various embodiments, the threshold may be selected adaptively picture-by-picture (i.e., image-by-image).

In various embodiments, the threshold may be selected adaptively stripe-by-stripe or even block-by-block.

In those embodiments where the threshold may be selected adaptively, the threshold value may be stored in a memory (together with the compressed data or elsewhere) and be communicated to the decoder for a proper decoding.

In various embodiments, lossless compression may be performed by skipping the thresholding step at 110 (that is, by notionally setting the threshold value to zero): in fact, in various embodiments, thresholding may be the only step in the compression system which causes loss of data.

Variable Length Coding (VLC)

In various embodiments, VLC as indicated at 112 may be used only to compress the HL, LH, and HH transformed coefficients, whereas LL values may be stored in the memory 14 as they may be, without any modifications.

In various embodiments, a O-order Exp-Golomb code may be used for VLC as shown in Table II below.

TABLE II

| Input symbols | Code Word | Bit Length |
| --- | --- | --- |
| 0 | 1 | 1 |
| ±[1, 2] | 01 s x | 4 |
| ±[3-6] | 001 s xx | 6 |
| ±[7-14] | 0001 s xxx | 8 |
| ±[15-30] | 00001 s xxxx | 10 |
| ±[30, . . . ] | 000001 s absvalue | 6 + P |

The cells in the first column contain a range of input values. The cells in the second column contain the code word used for that range of input values. The cells in the third column show the length of the code word in bits.

In various embodiments, the symbol zero may thus be encoded with the single-bit code '1'. Other values up to 30 (in absolute value) may be encoded with a code containing a prefix, a sign value (indicated with 's' in the table), and a suffix indicated by a series of 'x', each 'x' corresponding to one bit.

In various embodiments, the prefix may always be given by a '1' preceded by a number of '0' in order to reach a prefix length that may be identical to half the length of the whole codeword: in that way, the decoder will be able to understand the length of each codeword being decoded by simply counting the number of leading '0' bits before the first '1' encountered in the bit-stream.

In various embodiments, one or more of the following may apply:
  the bit 's' is 0 if the input value positive, 1 otherwise;
  the "xx . . . x" suffix may be given by the last k bits of the input value, where k is the number of 'x' contained in the code word as indicated in the table;
  in order to avoid code words with excessive length (which may make VLC processing unduly complicated while hardly providing any appreciable compression gain) less probable input symbols (i.e., those having an absolute value higher than 30) may be encoded with a fixed length code having binary prefix '000001' of length 6 followed by 1-bit sign value and the unaltered absolute value of the input symbol.

The value P in the last cell of the Table II above may be the precision in bits of the coefficient being coded in bits, depending on the dynamic range of input values. If pixel values are R=8 bits, then P can be 9 bits.

In various embodiments as exemplified herein, thresholding at 110 with a threshold equal to, e.g., T may be applied before VLC at 112, so that input symbols with values higher than zero and less than or equal to the threshold may not be possible.

For that reason, in various embodiments, the value T may be subtracted from the input symbols with values higher than zero: this may improve the efficacy of VLC because it avoids wasting code words for input symbols that cannot appear.

Figure 10:
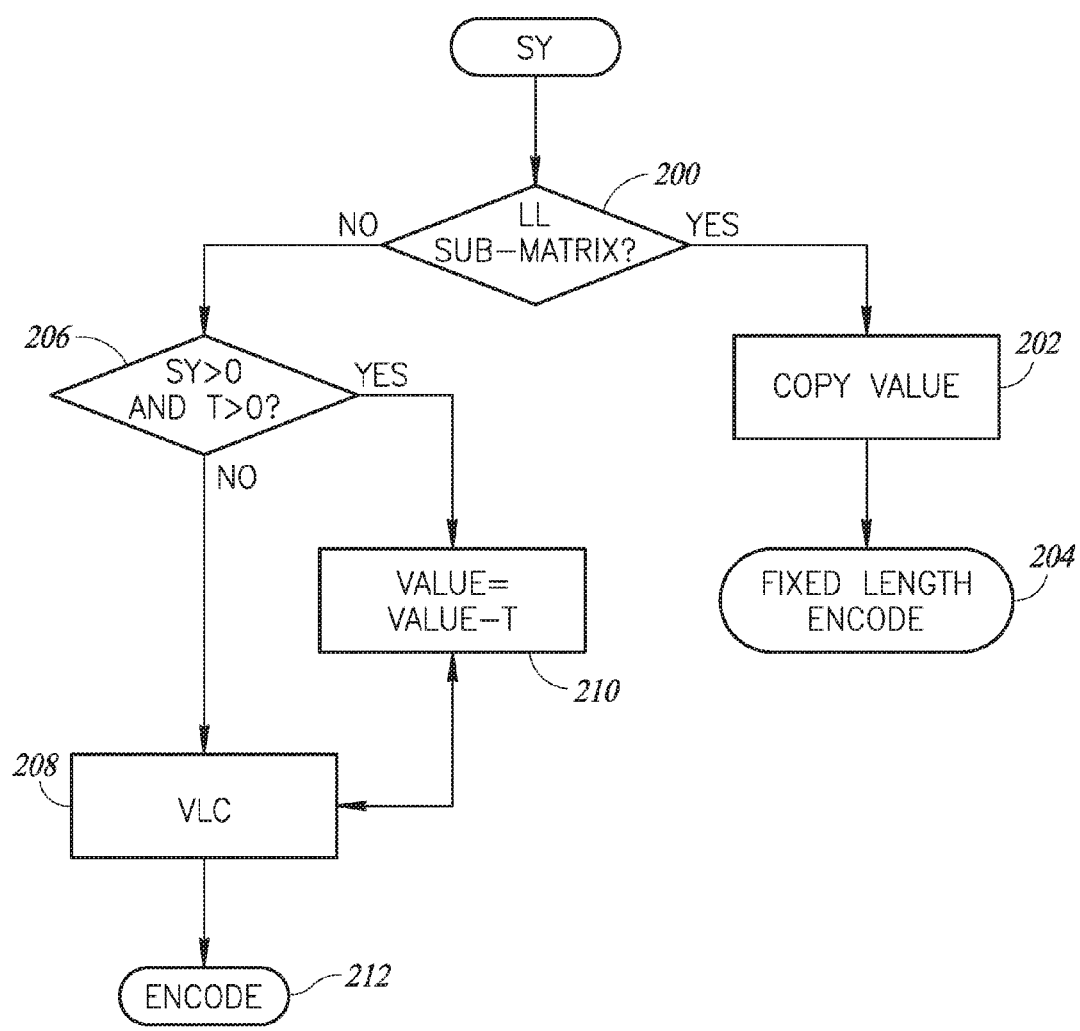
FIGS. 10 and 11 are exemplary flow charts of data processing in embodiments.

FIG. 10 shows an exemplary flowchart of VLC stage processing (de facto incorporating also the thresholding step at 110) performed on an input symbol SY, including the following steps:
  200: check as to whether the symbol SY belongs to an LL sub-matrix;
  202: if the outcome of step 200 is positive (YES), copy value and encode with a fixed length at 204;
  206: if outcome of step 200 is negative (NO), check if symbol SY is >0 AND T>0;
  208: if outcome of step 206 is negative (NO), apply VLC coding, e.g., Exp-Golomb;
  210: if outcome of step 206 is positive (YES), thresholding may be performed over T, i.e., a new value VALUE' may be generated equal to VALUE-T and then VLC coding at 208 may be applied on the new value VALUE'; and
  212: encode using variable length based on result of step 208 (however arrived at).

Decoder

Figure 11:
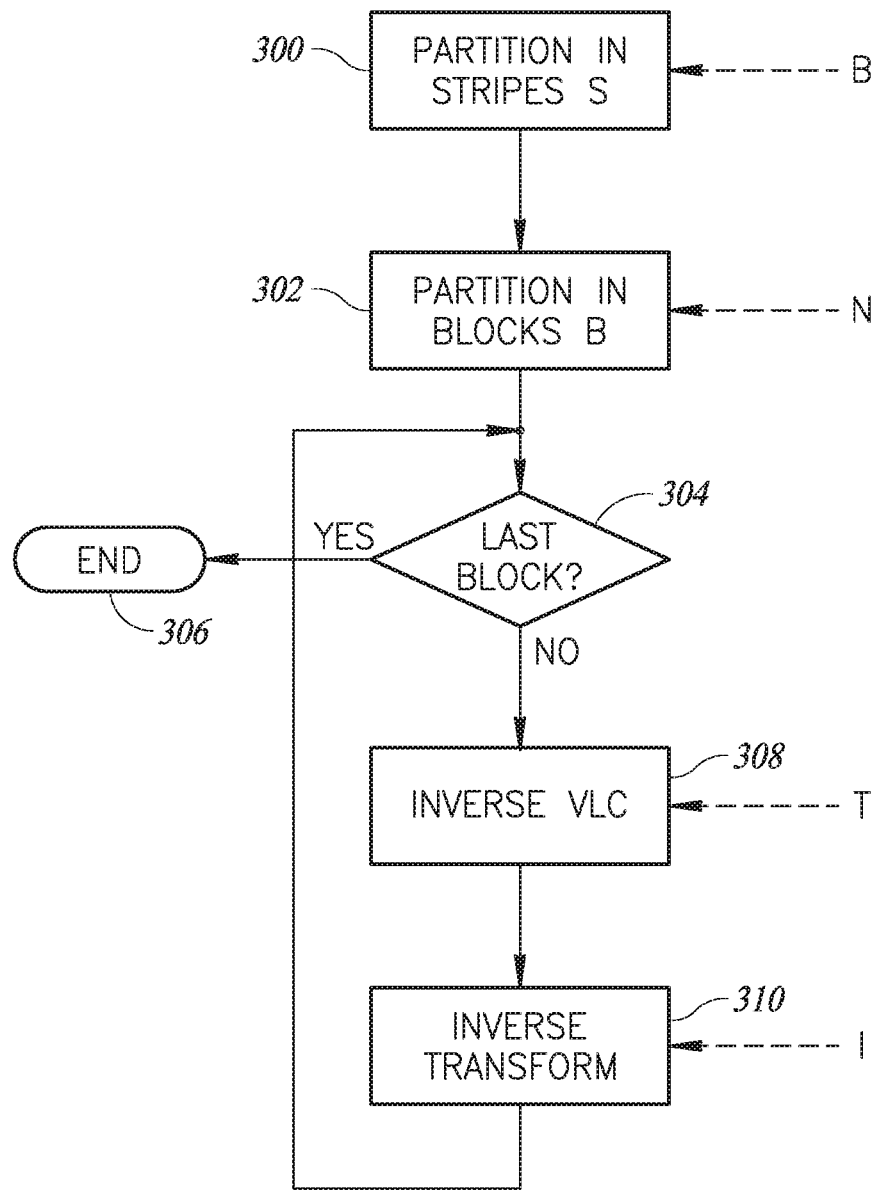

FIG. 11 is an exemplary flowchart of a decoding process according to embodiments. This may be approximately complementary to the exemplary encoding process of FIG. 6 according to embodiments: consequently, details disclosed in connection with a function of the exemplary embodiment of the encoding process will be understood to be applicable to perform the same function/complementary function also in the decoding process.

Again, in a step 300, the picture or each component of the picture to be decoded may be partitioned in stripes S; then, in a step 302, each stripe S may partitioned in blocks B, thus permitting a decoding process to be applied to each block B separately. In various embodiments, the decoding process may thus receive as an input a binary stream of compressed data and output an array of N×N pixel values for each block of the picture.

Similarly to the encoding process as exemplified in FIG. 6, in various embodiments a decoding process on a block-by-block basis may include a sequence of steps performed iteratively.

For instance, in a possible embodiment, the iterative sequence may be made conditional to the negative outcome (e.g., Last block? NO) of a check 304 as to whether the input block may be the last one. If the check at 304 yields a positive outcome (i.e., Last block? YES) indicative that the last block has been processed, then the process comes to an end at 306.

In various embodiments, as exemplified in FIG. 11, the decoding process may include two main steps, namely inverse Variable Length Coding (inverse VLC) at 308 and inverse transform at 310.

It will be appreciated that an inverse thresholding stage proper (other than as detailed in the following) may not be present as thresholding may not be generally invertible to recover the original values at the decoder side.

Variable Length Decoding

In various embodiments, the stage 308 may receive transformed coefficients which may belong to a LL, LH, HL, or HH sub-matrix of wavelet coefficients.

Decoding coefficients belonging to an LL sub-matrix may not be involved since these coefficients may be simply read from the input stream and copied.

Coefficients belonging to other sub-matrixes may be encoded with the 0-order Exp-Golomb variable length code as explained previously with reference to the exemplary encoder of FIG. 6, and, therefore, they may be decoded accordingly, such decoding being otherwise adapted to be implemented as a simple, straightforward operation.

If thresholding with a value T was applied at the encoding side, then the value T may be added to output values which are not zero, in order to obtain their true value.

Inverse Transform

In various embodiments, the inverse transform of step 310 may be a straightforward inversion of the transform in the encoding process 108 described previously in connection with the exemplary encoder of FIG. 6.

In various embodiments, the inverse transform of step 310 may be an inverse wavelet transform.

Again, a bi-dimensional transform may be implemented by applying uni-directional inverse transform (e.g., Haar wavelet) first by columns (resp. lines) and then by lines (resp. columns).

In various embodiments, a uni-dimensional Haar wavelet inverse transform may be implemented as follows.

Given a vector t=[h[ ]] composed by two sub-vectors of N/2 elements, the processing generates a vector a[ ] where each element may be calculated as follows:

$$a[2*i]=((l[i]<<1)+h[i]+1)>>1$$

$$a[2*i+1]=((l[i]<<1)-h[i]+1)>>1$$

The notation ">>1" may be again used to indicate a division by two implemented by a logical shift right of 1 bit. The notation "<<1" may be used to indicate a multiplication by two implemented by a logical shift left of 1 bit.

Experimental Results

Experimental tests with various configurations demonstrate the effectiveness of embodiments.

A number of tests were performed using a set of 16 different pictures in YUV 4:2:0 format, with spatial resolution of 1280×720 pixels, by applying embodiments to such a set of original pictures as a worst-case scenario.

In common applications, the input video may be frequently available after compression and decompression, and the set of test pictures was compressed with the standard reference software model of the H.264/AVC video coding standard, in order to have a more realistic performance evaluation. Pictures which have already been compressed may be easier to re-compress, because compression has a low-pass effect which removes high-frequency spatial details which may be lost and are not encoded again.

The sequence of original pictures has been H.264/AVC compressed with fixed quantization parameters QP=35 (corresponding to a low quality setting) and QP=25 (corresponding a fairly good visual quality). The embodiments have been configured with 16×16 pixel blocks for luminance (Y component), 8×8 pixel blocks for chrominance (U and V components) and 2 wavelet iterations for both luma and chroma.

Wavelet iterations have been fixed to two, so that the segment on which the unidirectional wavelet transform actually operates had a dimension of $2^{iterations}=2^2=4$, and the blocks for the bi-dimensional transform were actually of 4×4 pixels.

In various embodiments, the procedure may be configured to operate on larger blocks for ease of memory access and parallel computation, with no difference in terms of compression ratio or quality.

For thresholding, three different configurations were tested for luma and chroma thresholds, called respectively $T_Y$ and $T_{UV}$, namely:

$T_Y=T_{UV}=0$, corresponding to lossless compression;

$T_Y=0$ and $T_{UV}=2$, corresponding to lossless compression for luma and lossy for chroma; and $T_Y=1$ and $T_{UV}=3$, corresponding to a moderate compression on luma and a more aggressive compression on chroma.

The second and third configurations above may take advantage of the fact that the human visual system may be sensitive to compression artifacts on the luminance component and much less sensitive to the chroma components, so that a higher compression may be applied to the U-V components rather than to the Y component.

Results were obtained for three different compression configurations called lossless ($T_Y=T_{UV}=0$), chroma-lossy ($T_Y=0$, $T_{UV}=2$) and lossy ($T_Y=1$ and $T_{UV}=3$), the input data being a set of 16 pictures, either in original uncompressed format, or co-decompressed with H.264/AVC with QP equal to 25 and 35, as detailed previously.

Performance was evaluated, on the basis of two parameters:

i) the compression factor, that may be the size of input data in bytes divided by the size of output data in bytes (for instance, a compression factor of two means that the proposed compression method may reduce the data size to one half)

ii) PSNR (Peak Signal to Noise Ratio), computed on each component; PSNR is an objective quality metric with good correlation with the human visual system and expresses the difference between input images (before compression) and output images (after compression) in dB on a logarithmic scale. A PSNR higher than 48 dB corresponds to unnoticeable differences (provided those differences are uniformly distributed spatially); in the case of lossless compression, there may be of course no difference between the input and the output and the PSNR may be infinite.

The results obtained demonstrate that, despite their low complexity, various embodiments may provide remarkable compression factors while still maintaining high quality. For instance, in a lossless configuration, an average compression factor exceeding 2.0 was obtained on H.264/AVC co-decoded pictures without quality degradation. In lossy configurations, average compression factors exceeding 3.0 were obtained with visually un-noticeable distortions.

Further tests were performed in order to evaluate performance of various embodiments against the REMPEG procedure for image compression already referred to in the introductory portion of this description as incorporated in various products. For instance, REMPEG 2.0 is a family of embedded image compression procedures available in several versions, offering many possible trade-offs between complexity, compression performance, and quality.

The same image sequences used in the previous tests have been used, by configuring REMPEG both in a lossless mode and in a lossy mode with a) segment sizes of 16 pixels (16P) and four different compression ratios (1.84, 2.00, 2.08, 2.18) and b) a segment size of 32 pixels (32P) and 5 different compression ratios (1.88, 2.00, 2.08, 2.18, 2.23)

For the purpose of comparison, the embodiments have been configured both as lossless and as lossy with luma threshold=1 and chroma threshold={1, 2, 3}.

While aiming at fulfilling the same purpose, REMPEG and the embodiments are different procedures, which make direct comparison difficult.

Comparison data were obtained for lossy configurations for different input sequences, by evaluating quality in terms of a single PSNR value derived from the PSNR values obtained for the three YUV color channels and defined as $$PSNR=(6\times PSNR_Y+PSNR_U+PSNR_V)/8$$

Embodiments were found to offer a higher compression ratio than REMPEG, with a lower PSNR, which may bear witness to the two solutions being adapted to be regarded as complementary.

An advantage of embodiments was found to lie in the ability to adapt the compression factor to the sequence content, achieving higher compression for co-decoded pictures. By way of comparison, REMPEG™ achieves the same compression ratio regardless of the input signal, since the compression may be pre-determined.

Comparison results for lossless configurations may not refer to PSNR, which in this case may have an infinite value since the input and output pictures may be identical, so that performance may be evaluated in terms of the compression factor achieved. From those results, embodiments were found to achieve better performance than REMPEG™ in the lossless case.

Without prejudice to the principle of the disclosure, the details of construction and the embodiments may vary, even significantly, with respect to what is illustrated herein purely by way of non-limiting example, without prejudice to the extent of protection.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. An apparatus, comprising:
   a converter circuit configured to transform stripes of input image blocks in a first domain, each stripe being a set of consecutive input image blocks in scan order within a corresponding digital image, into transformed image blocks in a second domain; and
   a coder circuit configured
      to variable-length code values of the transformed image blocks, and
      to generate compressed image blocks from the variable-length-coded values; and
   a determiner configured to determine for the compressed image blocks an address size that the compressed image blocks would occupy if they were the corresponding input image blocks to thereby allow random access to each stripe of the digital image.

2. The apparatus of claim 1 wherein:
   the first domain includes a pixel domain; and
   the second domain includes a frequency domain.

3. The apparatus of claim 1, further comprising a partitioner circuit configured to partition the digital image into of the stripes of input image blocks.

4. The apparatus of claim 1, further comprising a comparator circuit configured:
   to compare each value of the transformed image blocks to a threshold,
   to generate a substitute for the value if a magnitude of the value is less than the threshold; and
   to provide to the coder circuit as the values of the transformed image blocks the values of the transformed image block for which the comparator did not generate substitutes, and the substitutes.

5. A system, comprising:
   a bus;
   a first circuit configured to provide first image data;
   a first compressor coupled between the first circuit and the bus and configured:
      to receive the first image data from the first circuit,
      to compress the first image data, and
      to provide the compressed first image data to the bus; and
   a second circuit coupled to the bus and configured:
      to receive the compressed first image data from the bus;
      to store the compressed first image data within an actual address range; and
      to convert an address within an address range that the stored compressed first image data would occupy were it not compressed into a corresponding address within the actual address range.

6. The system of claim 5 wherein the first circuit, the bus, and the compressor are disposed on a same integrated-circuit die.

7. The system of claim 5 wherein the first circuit, the bus, and the compressor are disposed on two or more integrated-circuit dies.

8. The system of claim 5 wherein:
   the first circuit is configured to provide blocks of the first image data in a first domain; and
   the compressor
      includes a converter circuit configured to transform the blocks of the first image data in the first domain into respective transformed blocks of the first image data in a second domain,
      includes a coder circuit configured to variable-length code values of the first image data in the transformed blocks, and to generate respective compressed blocks of the first image data from the variable-length-coded values, and is configured to provide the compressed blocks of the first image data to the bus.

9. The system of claim 5, wherein:

the first circuit is configured to generate blocks of the first image data in a first domain; and the compressor includes a converter circuit configured to transform the blocks of the first image data in the first domain into respective transformed blocks of the first image data in a second domain, includes a comparator circuit configured to compare each value of the first image data in the transformed blocks to a threshold, to generate a substitute for the value if a magnitude of the value is less than the threshold, and to provide as the values of the first image data in the transformed image blocks the values of the first image data in the transformed blocks for which the comparator did not generate substitutes, and the substitutes, and includes a coder circuit configured to variable-length code the values of the first image data in the transformed blocks from the comparator, and to generate respective compressed blocks of the first image data from the variable-length-coded values, and is configured to provide the compressed blocks of the first image data to the bus.

10. The system of claim 5, further comprising a decompressor coupled between the first circuit and the bus and configured:

to receive compressed second image data from the bus, to decompress the compressed second image data, and to provide the decompressed second image data to the first circuit.

11. The system of claim 5, further comprising a decompressor coupled between the first circuit and the bus, configured to receive blocks of second image data in a first domain from the bus, and:

including a converter circuit configured to inverse transform the blocks of the second image data in the first domain into respective inverse-transformed blocks of the second image data in a second domain, including a decoder circuit configured to variable-length decode values of the second image data in the inverse-transformed blocks, and to generate respective decompressed blocks of the second image data from the variable-length-decoded values, and configured to provide the decompressed blocks of the second image data to the first circuit.

12. The system of claim 5, further comprising a second circuit coupled to the bus and configured to receive the compressed first image data from the bus.

13. The system of claim 5, further comprising:

a second circuit coupled to the bus, configured to receive the compressed first image data from the bus, and configured to provide compressed second data to the bus; and a decompressor coupled between the first circuit and the bus and configured:

to receive the compressed second image data from the bus, to decompress the compressed second image data, and to provide the decompressed second image data to the first circuit.

14. The system of claim 5, further comprising:

a first decompressor coupled between the first circuit and the bus and configured to receive compressed second image data from the bus, to decompress the compressed second image data, and to provide the decompressed second image data to the first circuit;

a second circuit coupled to the bus;

a second compressor coupled between the second circuit and the bus and configured to receive third image data from the second circuit, to compress the third image data, and to provide the compressed third image data to the bus; and a second decompressor coupled between the second circuit and the bus and configured to receive compressed fourth image data from the bus, to decompress the compressed fourth image data, and to provide the decompressed fourth image data to the second circuit.

15. A method, comprising:

receiving first image data from a circuit;

partitioning the first image data into first image data blocks;

arranging the first image data blocks in stripes, each stripe including a set of consecutive first image data blocks in scan order within the first image data;

compressing the first image data blocks to generate compressed encoded first image data blocks;

providing the compressed encoded first image data blocks to a bus; and storing in a memory coupled to the bus the encoded first image data blocks arranged in stripes by producing a reference table relating a notional memory address of each stripe stored in the memory in uncompressed form into an actual memory address of each stripe stored in the memory in compressed form including a set of consecutive compressed encoded first image data blocks.

16. The method of claim 15 wherein the circuit, the bus, and the compressor are disposed on a same integrated-circuit die.

17. The method of claim 15, further comprising:

receiving second image data from the bus;

decompressing the second image data; and providing the decompressed second image data to the circuit.

18. The method of claim 15, further comprising:

receiving with a second circuit the compressed first image data from the bus;

providing compressed second image data from the second circuit to the bus;

receiving the compressed second image data from the bus;

decompressing the compressed second image data; and providing the decompressed second image data to the first circuit.

19. The method of claim 15, further comprising:

receiving the compressed first image data from the bus;

decompressing the compressed first image data;

providing the decompressed first image data to a second circuit;
providing second image data from the second circuit;
compressing the second image data;
providing the compressed second image data to the bus;
receiving the compressed second image data from the bus;
decompressing the compressed second image data; and
providing the decompressed second image data to the first circuit.

20. A non-transitory computer-readable medium storing instructions that, when executed by one or more computing apparatuses, cause the one or more computing apparatuses, or cause one or more other apparatuses under control of the one or more computing apparatuses:
to receive first image data from a circuit;
to partition the first image data into first image data blocks;
to arrange the first image data blocks in stripes, each stripe including a set of consecutive first image data blocks in scan order within the first image data;
to compress the first image data blocks to generate compressed encoded first image data blocks; and
to provide the compressed encoded first image data blocks to a bus; and
to store in a memory coupled to the bus the encoded first image data blocks arranged in stripes by producing a reference table relating a notional memory address of each stripe stored in the memory in uncompressed form into an actual memory address of each stripe stored in the memory in compressed form including a set of consecutive compressed encoded first image data block.

21. The non-transitory computer-readable medium of claim 20, wherein the instructions that, when executed by one or more computing apparatuses, cause the one or more computing apparatuses, or cause one or more other apparatuses under control of the one or more computing apparatuses, to compress the first image data blocks to generate compressed encoded first image data blocks further comprises transforming the first image data blocks into the frequency domain to generated the compressed encoded first image data blocks.

* * * * *